(12) United States Patent
Liu et al.

(10) Patent No.: US 12,462,476 B2
(45) Date of Patent: Nov. 4, 2025

(54) METHOD, ELECTRONIC DEVICE, AND COMPUTER PROGRAM PRODUCT FOR GENERATING THREE-DIMENSIONAL MODEL

(71) Applicant: Dell Products L.P., Round Rock, TX (US)

(72) Inventors: Zhisong Liu, Shenzhen (CN); Zijia Wang, Weifang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 320 days.

(21) Appl. No.: 18/110,165

(22) Filed: Feb. 15, 2023

(65) Prior Publication Data
US 2024/0249469 A1 Jul. 25, 2024

(30) Foreign Application Priority Data
Jan. 19, 2023 (CN) .......................... 202310086910.5

(51) Int. Cl.
*G06T 15/04* (2011.01)
*G06T 15/20* (2011.01)
(Continued)

(52) U.S. Cl.
CPC .............. *G06T 17/00* (2013.01); *G06T 15/04* (2013.01); *G06T 15/20* (2013.01); *G06T 15/205* (2013.01);
(Continued)

(58) Field of Classification Search
CPC ........ G06T 17/00; G06T 15/04; G06T 15/205
See application file for complete search history.

(56) References Cited

FOREIGN PATENT DOCUMENTS

| CN | 113012021 | * | 6/2021 | ........... G06T 3/4007 |
| KR | 101805636 | * | 12/2017 | ............. G06T 17/00 |

(Continued)

OTHER PUBLICATIONS

A. Toshev et al., "DeepPose: Human Pose Estimation via Deep Neural Networks," arXiv:1312.4659v3, Aug. 20, 2014, 9 pages.

(Continued)

*Primary Examiner* — Said Broome
*Assistant Examiner* — Denis Vasiliy Minko
(74) *Attorney, Agent, or Firm* — Ryan, Mason & Lewis, LLP

(57) ABSTRACT

Embodiments of the present disclosure relate to a method, an electronic device, and a computer program product for generating a three-dimensional (3D) model. The method includes generating two-dimensional (2D) features of a 2D image on the basis of performing feature extraction on the 2D image. The method further includes generating, on the basis of the 2D features by using a symmetric conversion module, 2D features subjected to symmetric conversion, wherein the symmetric conversion module is configured to generate 2D features of an object in the 2D image in different viewing angles. The method further includes generating a 3D model of the 2D image on the basis of the 2D features subjected to symmetric conversion. By means of embodiments of the present disclosure, the generation of the 3D model can be supervised by using the symmetric conversion module, thus achieving generation of a 3D model with a better effect.

20 Claims, 7 Drawing Sheets

(51) Int. Cl.
G06T 17/00 (2006.01)
G06T 19/20 (2011.01)
G06V 10/40 (2022.01)
G06V 10/82 (2022.01)
G06V 40/10 (2022.01)

(52) U.S. Cl.
CPC .............. *G06T 19/20* (2013.01); *G06V 10/40* (2022.01); *G06V 10/82* (2022.01); *G06V 40/10* (2022.01); *G06T 2200/08* (2013.01); *G06T 2219/20* (2013.01)

(56) References Cited

FOREIGN PATENT DOCUMENTS

| KR | 101805636 B1 | * | 12/2017 | ............ G06T 17/00 |
| KR | 20210038451 | * | 4/2021 | ........... G06V 10/757 |
| KR | 102323703 | * | 11/2021 | ............ A61B 5/055 |
| KR | 102323703 B1 | * | 11/2021 | ............ A61B 5/055 |

OTHER PUBLICATIONS

J. Wang et al., "Deep High-Resolution Representation Learning for Visual Recognition," arXiv:1908.07919v2, Mar. 13, 2020, 23 pages.

Z. Cao et al., "OpenPose: Realtime Multi-Person 2D Pose Estimation using Part Affinity Fields," arXiv:1812.08008v2, May 30, 2019, 14 pages.

G. Pavlakos et al., "Coarse-to-Fine Volumetric Prediction for Single-Image 3D Human Pose," arXiv:1611.07828v2, Jul. 26, 2017, 10 pages.

D. Pavllo et al., "3D Human Pose Estimation in Video With Temporal Convolutions and Semi-Supervised Training," arXiv:1811.11742v2, Mar. 29, 2019, 13 pages.

Y. Cheng et al., "Occlusion-Aware Networks for 3D Human Pose Estimation in Video," IEEE/CVF International Conference on Computer Vision, Oct. 2019, 10 pages.

M. Loper et al., "SMPL: A Skinned Multi-Person Linear Model," ACM Transactions on Graphics, vol. 34, No. 6, Nov. 2015, pp. 248:1-248:16.

G. Pavlakos et al., "Expressive Body Capture: 3D Hands, Face, and Body from a Single Image," arXiv:1904.05866v1, Apr. 11, 2019, 22 pages.

N. Mahmood et al., "AMASS: Archive of Motion Capture as Surface Shapes," arXiv:1904.03278v1, Apr. 5, 2019, 12 pages.

A. Kanazawa et al., "End-to-end Recovery of Human Shape and Pose," arXiv:1712.06584v2, Jun. 23, 2018, 10 pages.

M. Kocabas et al., "VIBE: Video Inference for Human Body Pose and Shape Estimation," arXiv:1912.05656v3, Apr. 29, 2020, 12 pages.

S. Saito et al., "PIFu: Pixel-Aligned Implicit Function for High-Resolution Clothed Human Digitization," arXiv:1905.05172v3, Dec. 3, 2019, 15 pages.

S. Saito et al., "PIFuHD: Multi-Level Pixel-Aligned Implicit Function for High-Resolution 3D Human Digitization," IEEE/CVF Conference on Computer Vision and Pattern Recognition, Jun. 2020, 10 pages.

Y. Xiu et al., "ICON: Implicit Clothed Humans Obtained from Normals," arXiv:2112.09127v2, Mar. 28, 2022, 22 pages.

* cited by examiner

METHOD, ELECTRONIC DEVICE, AND COMPUTER PROGRAM PRODUCT FOR GENERATING THREE-DIMENSIONAL MODEL

RELATED APPLICATION

The present application claims priority to Chinese Patent Application No. 202310086910.5, filed Jan. 19, 2023, and entitled "Method, Electronic Device, and Computer Program Product for Generating Three-Dimensional Model," which is incorporated by reference herein in its entirety.

FIELD

Embodiments of the present disclosure relate to the field of computers, and more particularly, to a method, an electronic device, and a computer program product for generating a three-dimensional model.

BACKGROUND

Metaverse is a new trend that is leading humans into a new digital era in which people can obtain authentic virtual experiences. The metaverse is therefore playing an increasingly important role in human society. One of the core functions of the metaverse is three-dimensional (3D) human body digitalization. Many metaverse applications require high-quality humanity digitalization. Therefore, it is very important to simulate 3D human body digitization that can interact with real people. However, it is challenging to realize 3D human body digitization because users can usually only provide two-dimensional (2D) images.

SUMMARY

Embodiments of the present disclosure provide a method, an electronic device, and a computer program product for generating a three-dimensional model.

In one aspect of the present disclosure, a method for generating a 3D model is provided. The method includes: generating 2D features of a 2D image on the basis of performing feature extraction on the 2D image; generating, on the basis of the 2D features by using a symmetric conversion module, 2D features subjected to symmetric conversion, wherein the symmetric conversion module is configured to generate 2D features of an object in the 2D image in different viewing angles; generating a 3D model of the 2D image on the basis of the 2D features subjected to symmetric conversion.

In another aspect of the present disclosure, an electronic device is provided. The device includes a processing unit and a memory, wherein the memory is coupled to the processing unit and stores instructions. The instructions, when executed by the processing unit, perform the following actions: generating 2D features of a 2D image on the basis of performing feature extraction on the 2D image; generating, on the basis of the 2D features by using a symmetric conversion module, 2D features subjected to symmetric conversion, wherein the symmetric conversion module is configured to generate 2D features of an object in the 2D image in different viewing angles; generating a 3D model of the 2D image on the basis of the 2D features subjected to symmetric conversion.

In still another aspect of the present disclosure, a computer program product is provided. The computer program product is tangibly stored in a non-transitory computer-readable medium and contains machine-executable instructions. The machine-executable instructions, when executed by a machine, cause the machine to perform a method or process according to embodiments of the present disclosure.

This Summary is provided to introduce the selection of concepts in a simplified form, which will be further described in the Detailed Description below. The Summary is neither intended to identify key features or essential features of the present disclosure, nor intended to limit the scope of embodiments of the present disclosure.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which.

Throughout all the drawings, the same or similar reference numerals represent the same or similar elements.

DETAILED DESCRIPTION

Illustrative embodiments of the present disclosure will be described in more detail below with reference to the accompanying drawings. While some specific embodiments of the present disclosure are shown in the accompanying drawings, it should be understood that the present disclosure may be implemented in various forms, and should not be viewed as being limited to the embodiments set forth herein. Rather, these embodiments are provided to make the present disclosure more thorough and complete and to fully convey the scope of the present disclosure to those skilled in the art.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless otherwise specifically indicated.

In addition, all specific numerical values herein are examples, which are provided only to aid in understanding, and are not intended to limit the scope.

It is challenging to realize generation of a 3D model of an object because users can usually only provide 2D images. Since 2D images do not have depth information, prior information needs to be learned from a large number of data sets, causing extremely high realization cost. For this reason, an embodiment of the present disclosure provides techniques for generating a 3D model. 2D images of an object in different viewing angles are taken as inputs. A symmetric conversion module is used to process 2D features of the 2D images to obtain 2D features in corresponding symmetrical viewing angles. 3D reconstruction is performed on the 2D features in corresponding symmetrical viewing angles to obtain 3D models in corresponding symmetrical viewing angles. Due to the symmetry of the processing of 2D features by the symmetric conversion module, self-supervision can be realized in the generation of 3D models to complete a training process of the generation of 3D models. Therefore, 3D models can be obtained by inputting 2D images. By means of embodiments of the present disclosure, the generation of 3D models can be supervised by using the symmetric conversion module, thus achieving generation of a 3D model with a better effect.

Basic principles and several example implementations of the present disclosure are illustrated below with reference to FIG. 1 to FIG. 7. It should be understood that these example embodiments are given only to enable those skilled in the art to better understand and thus implement embodiments of the present disclosure, and are not intended to limit the scope of the present disclosure in any way.

Figure 1:
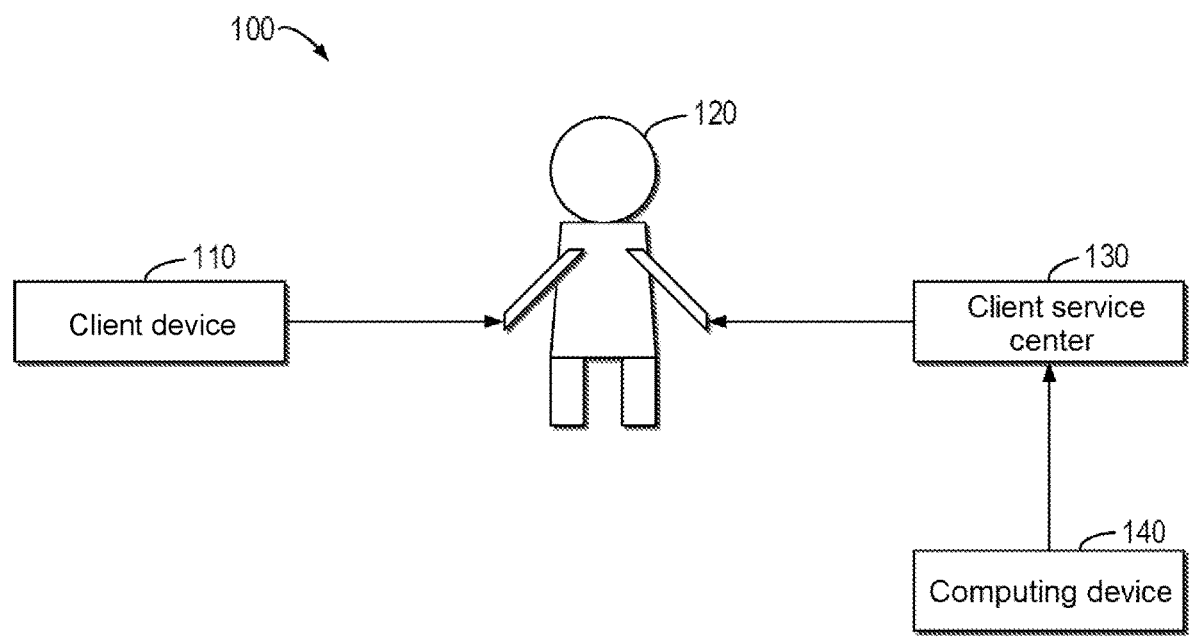
FIG. 1 illustrates a schematic diagram of an architecture of an example system according to the present disclosure.

FIG. 1 illustrates a schematic diagram of an architecture of example system 100 according to the present disclosure. As shown in FIG. 1, example system 100 may include client device 110, 3D digital person 120, client service center 130, and computing device 140. This example system mainly describes an actual use example of generation of a 3D model, which is not limited to generating a 3D digital person, but can generate other 3D models, mainly depending on the purpose of the system.

In client device 110, a user requests a client service from client service center 130. A client device can include, for example, a mobile communication device, a tablet, a laptop, a desktop, and a virtual reality headset device. In response, client service center 130 displays, in client device 110, 3D digital person 120 to the user to interact with the user. Compared with traditional voice or text interaction, the user can get a better experience. Computing device 140 is configured to train and deploy 3D models, and may be connected with client service center 130 through a network. It should be understood that generation of 3D models is not only used in client service scenarios, but also can be used in full-digital exhibition halls, virtual reality applications, on-line education, and other scenarios.

It should be understood that the architecture and functions of example system 100 are described for illustrative purposes only, without implying any limitation to the scope of the present disclosure. Embodiments of the present disclosure may also be applied to other environments having different structures and/or functions.

Figure 2:
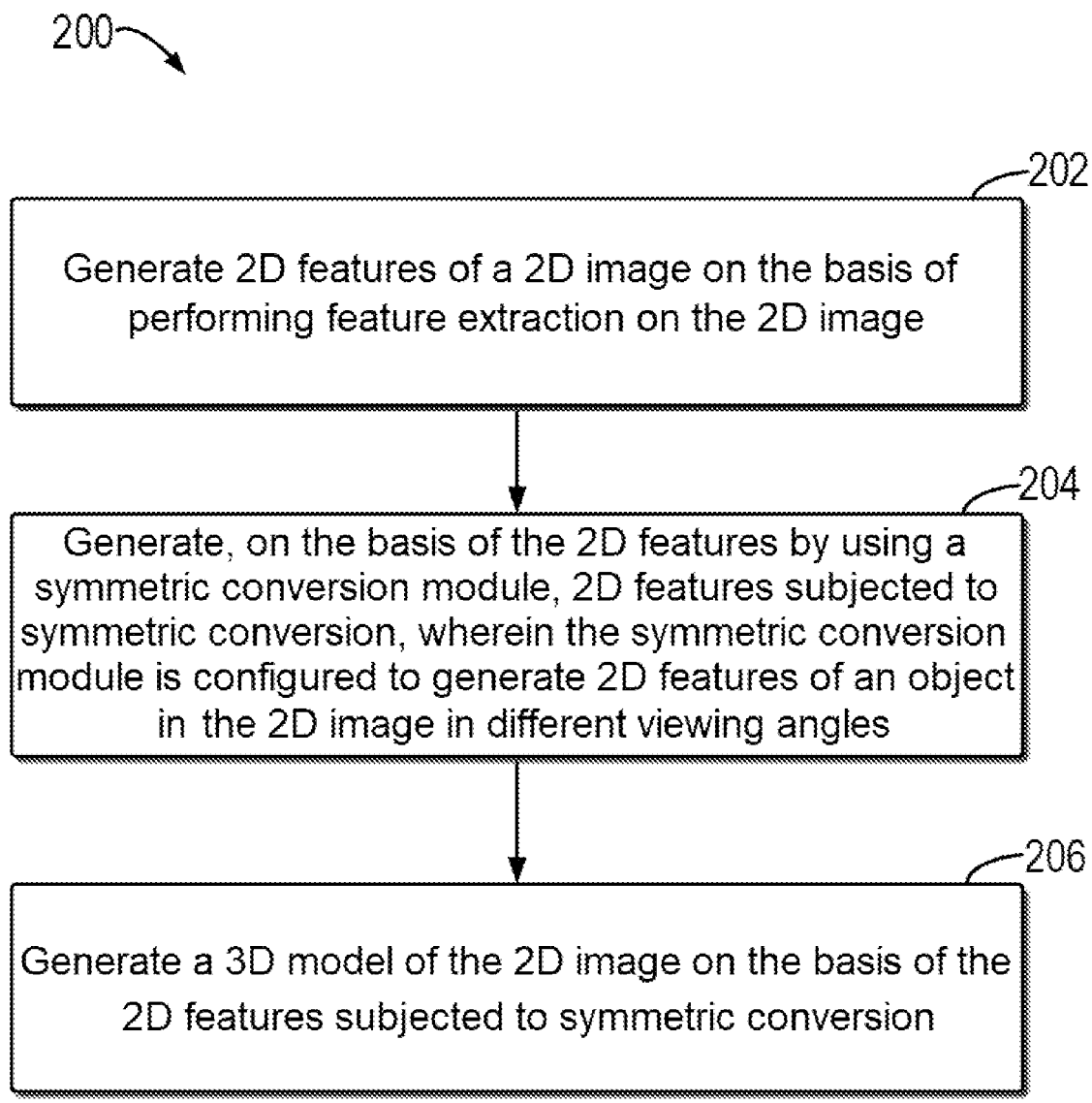
FIG. 2 is a flow chart of a process for generating a 3D model according to an example implementation of the present disclosure.

FIG. 2 is a flow chart of a process 200 for generating a 3D model according to an example implementation of the present disclosure. At block 202, 2D features of a 2D image are generated on the basis of performing feature extraction on the 2D image. It can be understood that in machining learning and/or deep learning, feature is an abstract concept and does not necessarily correspond to some physical meaning(s) of a target object. For example, a 2D image may be a 2D digital person image. The 2D digital person image may be a 2D digital person image seen from a front viewing angle, which shows the front face of a digital person. The 2D image may also be a 2D digital person image seen from a back viewing angle, which shows the back of a digital person.

In some embodiments, an image encoder can be used to perform the feature extraction on the 2D image. The image encoder can be implemented by using a Visual Geometry Group (VGG) network, a Residual Network (ResNet), etc., or by using a customized network model. For example, in some embodiments, the VGG network can be used to process the image of the 2D digital person in the front viewing angle to obtain 2D features of the image in the front viewing angle.

At block 204, 2D features subjected to symmetric conversion are generated on the basis of the 2D features by using a symmetric conversion module, wherein the symmetric conversion module is configured to generate 2D features of an object in the 2D image in different viewing angles. For example, the 2D features of the image of the digital person in the front viewing angle are obtained on the basis of processing the image of the 2D digital person in the front viewing angle using the VGG network. The symmetric conversion module is used to perform symmetric conversion processing, so that 2D features of the image of the digital person in the back viewing angle can be obtained.

It can be understood that the symmetric conversion module is not limited to conversion of a viewing angle by 180 degrees (for example, the image of the digital person is converted from the front viewing angle to the back viewing angle), but can rotate a viewing angle by any degree. In some embodiments, the symmetric conversion module can symmetrically convert the 2D features of the image on the basis of a camera viewing angle. The camera viewing angle defines an angle for conversion. For example, when the camera angle is 90 degrees, 2D features of the image of the digital person in a side viewing angle can be obtained from the 2D features of the image of the digital person in the front viewing angle, and an angle of sight between the front viewing angle and the side viewing angle is 90 degrees.

At block 206, a 3D model of the 2D image is generated on the basis of the 2D features subjected to symmetric conversion. In some embodiments, 3D reconstruction is performed on the 2D features subjected to symmetric conversion by using a surface decoder to generate 3D reconstruction features. For example, after the 3D reconstruction, the 2D features can be converted into 3D reconstruction features. In some embodiments, texture rendering is performed on the 3D reconstruction features by using a texture encoder to generate a 3D model. For example, texture rendering performed on the 3D reconstruction features of the digital person can add texture information such as clothes and colors in the 2D image of the digital person to the 3D model to generate the 3D model.

Figure 3:
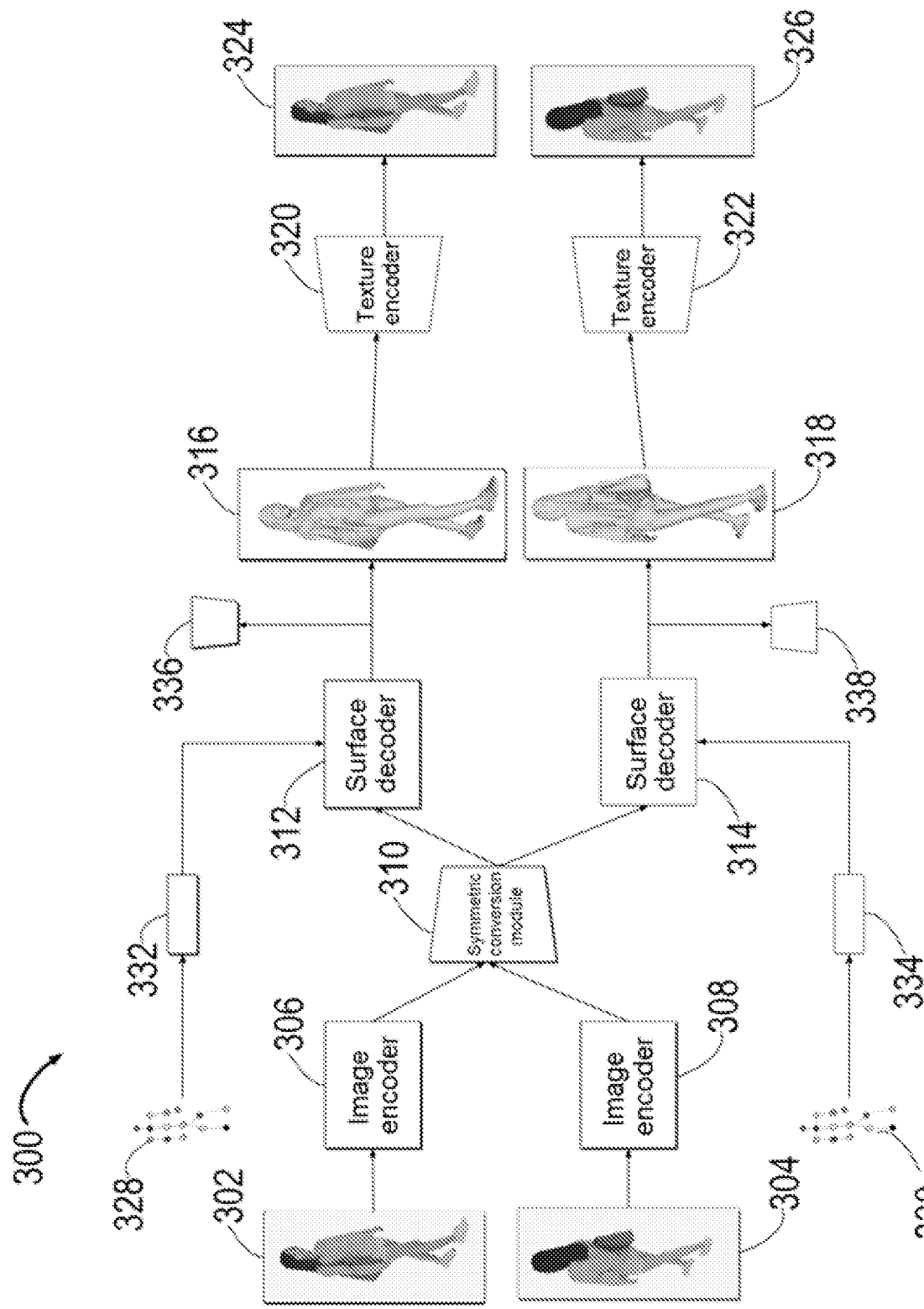
FIG. 3 is a schematic diagram of a training system for generating a 3D model according to some embodiments of the present disclosure.

FIG. 3 is a schematic diagram of training system 300 for generating a 3D model according to some embodiments of the present disclosure. As shown in FIG. 3, the training system includes input 302 and input 304. In the current embodiment, the inputs are the 2D image of the person object in the front viewing angle and the 2D image of the person object in the back viewing angle. It can be understood that other objects and images in different viewing angles can also be used as inputs. Block 306 and block 308 are image encoders. In the current embodiment, the VGG is used as the image encoder to extract 2D features of the 2D images. In addition or alternatively, a ResNet network or any other customized networks can also be used to extract 2D features.

Block 310 represents a symmetric conversion module. In the current embodiment, the symmetric conversion module can receive the 2D features of the image of the person object in the front viewing angle from the image encoder 306 as an input, and perform symmetric conversion on the features to obtain the 2D features of the image of the person object in the back viewing angle (that is, symmetric conversion of 180 degrees is performed on the viewing angles of the person object). In addition or alternatively, in another embodiment, the viewing angle of the person object can also be converted to other angles. Similarly, image encoder 308 also performs similar operations as those performed by image encoder 306. In some embodiments, parameters of image encoder 306 and image encoder 308 can be identical. Alternatively, the parameters of image encoder 306 and image encoder 308 may also be different.

Figure 5:
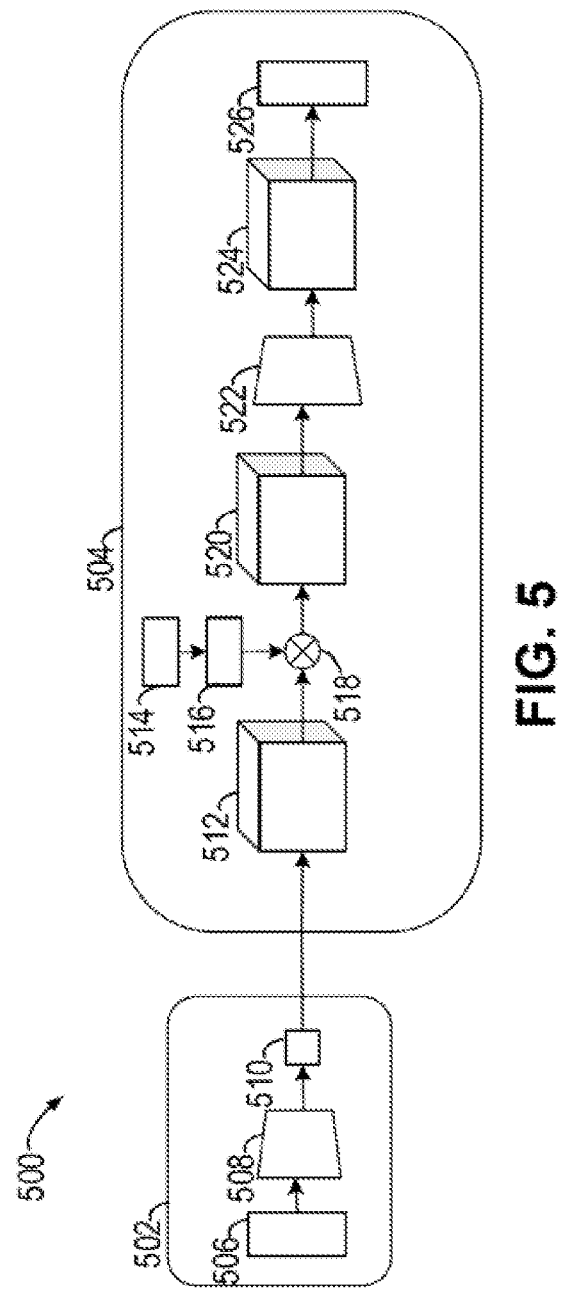
FIG. 5 illustrates a schematic diagram of an example architecture of an image encoder and a symmetric conversion module according to some embodiments of the present disclosure.

With regard to the processing performed by the symmetric conversion module, the following will describe an example implementation of the symmetric conversion module separately with reference to the description of FIG. 5.

Block 312 and block 314 respectively represent surface decoders with the same structures and parameters. In the current embodiment, surface decoders 312 and 314 are used to receive the 2D features subjected to symmetric conversion from the symmetric conversion module 310 and perform 3D reconstruction on the 2D features. Block 316 and block 318 represent 3D reconstruction features. Block 320 and block 322 represent texture encoders. In the current embodiment, the 3D reconstruction features are introduced into texture encoders 320 and 322 to generate final 3D models 324 and 326. For example, texture encoders 320 and 322 can be texture encoders with the same structures and parameters. They can render clothes, colors, etc. on the person object. It can be understood that input 2D image 302 and output final 3D model 324 have the same viewing angle (front viewing angle), and input 2D image 304 and output final 3D model 326 have the same viewing angle (back viewing angle). Based on this characteristic, a loss function between images and models in the same viewing angle can be minimized to optimize an overall 3D model generation process, and each module will be optimized correspondingly.

Block 328 and Block 330 represent 3D key points of the person object. The 3D key points are input into K-nearest neighbor (KNN) modules having the same parameters and represented by block 332 and block 334, respectively, to cluster the 3D key points. For example, the key points near the head are clustered, the key points near the elbows are clustered, and so on. In some embodiments, clustered information can be input into surface decoders 312 and 314 with the same structures and parameters respectively, and the KNNs are used to extract neighboring samples from a 3D estimate, constrain differences between the key points in the 3D models and the neighboring samples, and optimize a 3D reconstruction effect.

Block 336 and block 338 respectively represent multi-layer perceptron (MLP) modules with the same parameters, which are used to minimize intra-class differences (for example, different viewing angles of the same person) and maximize inter-class differences (for example, different viewing angles of different persons) to optimize the 3D model generation process. An example architecture of the MLP module will be described below only with reference to the description in FIG. 4.

Figure 4:
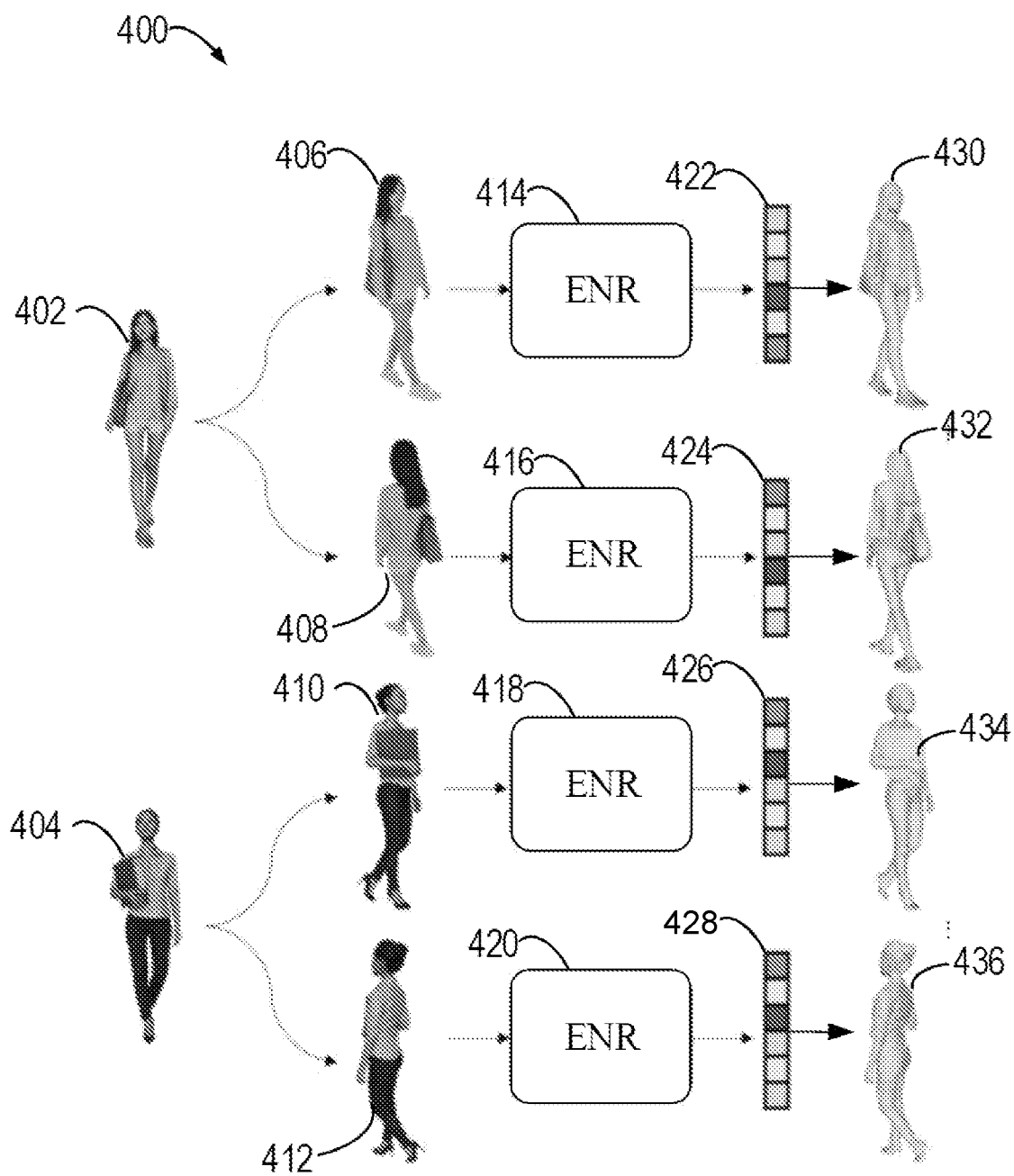
FIG. 4 illustrates a schematic diagram of an example architecture for a multilayer perceptron (MLP) according to some embodiments of the present disclosure.

FIG. 4 illustrates a schematic diagram of example architecture 400 for an MLP according to some embodiments of the present disclosure. In example architecture 400, 402 represents a first input object, 406 represents an image of first input object 402 in a front viewing angle, and 408 represents an image of first input object 402 in a back viewing angle. In the current embodiment, the first input object is a person object. It can be understood that the input object can be other types of objects. Similarly, 404 represents a second input object, 410 represents an image of second input object 404 in a front viewing angle, and 412 represents an image of second input object 404 in a back viewing angle. In the current embodiment, the second input object is a person object. It can be understood that the input object can be other types of objects. Blocks 414, 416, 418, and 420 respectively represent Equivariant Neural Rendering (ENR) modules with the same parameters. The ENR modules illustratively comprise an example of at least a portion of training system 300 for generating a 3D model discussed in FIG. 3, so as to process respective inputs to obtain corresponding features 422, 424, 426, and 428. In the current embodiment, outputs 430 and 432 are outputs of the first input object in different viewing angles, and outputs 434 and 436 are outputs of the second input object in different viewing angles. Compared with outputs of the same input object in different viewing angles, differences between outputs of different input objects in different viewing angles are greater. Therefore, intra-class differences (for example, different viewing angles of the same person) can be minimized, and inter-class differences (for example, different viewing angles of different persons) can be maximized, so as to optimize the 3D model generation process.

FIG. 5 illustrates a schematic diagram of example architecture 500 of an image encoder and a symmetric conversion module according to some embodiments of the present disclosure. As shown in FIG. 5, example architecture 500 includes image encoder 502 and symmetric conversion module 504, and an output of image encoder 502 is an input of symmetric conversion module 504.

Still referring to FIG. 5, image encoder 502 includes original feature 506, feature extractor 508, and extracted feature 510. Feature extractor 508 processes original feature 506 to obtain extracted feature 510. For example, in some embodiments, feature extractor 508 can be implemented by a VGG network, a ResNet network, and the like, or by using a customized network model. For example, in some embodiments, the VGG network can be used to process the image of the 2D digital person in the front viewing angle to obtain the 2D features of the image in the front viewing angle.

After extracted feature 510 is obtained, extracted feature 510 is transmitted to symmetric conversion module 504. First, extracted feature 510 is reshaped to convert the 2D feature into 3D feature 512. For example, a dimension of extracted feature 510 is 512*64*64. After the reshape operation, the dimension becomes 8*64*64*64. Block 514 indicates a camera pose. A default camera pose is a front viewing angle to indicate an angle of symmetric conversion. In some embodiments, different camera poses can be specified to convert the 2D feature to features in different angles. Block 516 represents a grid generator. Grid generator 516 samples 3D feature 512 to generate sampled 3D feature 520. For example, 3D feature 512 can be sampled by means of bicubic interpolation in component 518 to generate sampled 3D feature 520. Block 522 represents a 3D convolution module. 3D convolution module 522 performs a convolution operation on sampled 3D feature 520 to generate convolved 3D feature 524. In some embodiments, convolution filters of different dimensions can be used in the convolution process to obtain an optimal convolution result. Convolved 3D feature 524 is reshaped to generate final 2D feature 526 subjected to symmetric conversion.

Figure 6:
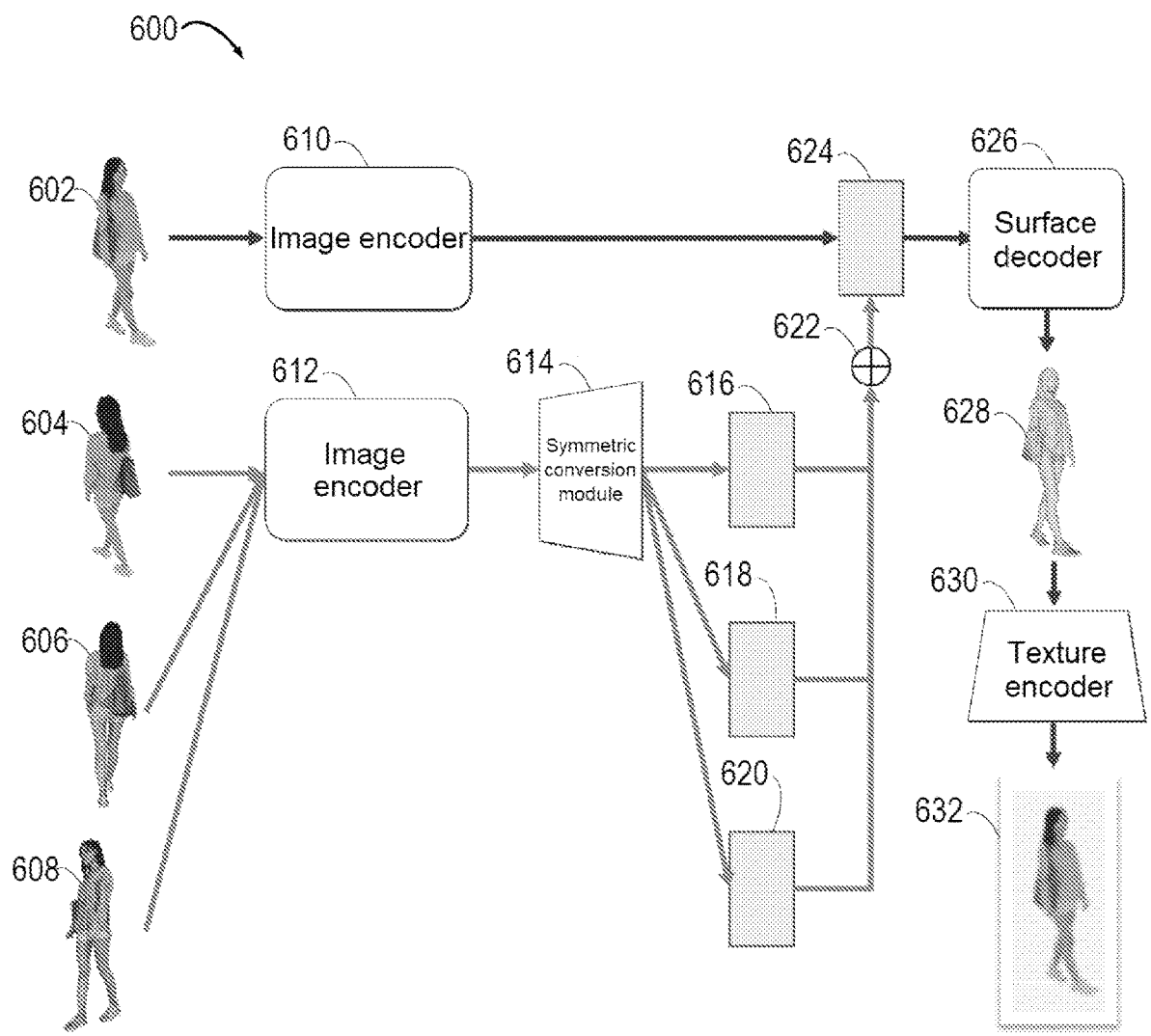
FIG. 6 illustrates a schematic diagram of an example architecture of multi-viewing-angle processing according to some embodiments of the present disclosure.

FIG. 6 illustrates a schematic diagram of example architecture 600 of multi-viewing-angle processing according to some embodiments of the present disclosure. According to the aforementioned embodiments, the present disclosure can generate corresponding 3D models when 2D images are input. In some embodiments, multiple 2D images in different viewing angles are provided, which can provide more information for the generation of 3D models, so as to optimize the generation of 3D models. As shown in FIG. 6, inputs 602, 604, 606, and 608 are 2D images of the same person in different viewing angles, and information of inputs 604, 606, and 608 is used to assist in the generation of a 3D model in the same viewing angle as input 602. It can be understood that an input image is not limited to an image of a person, but can also be other types of images. Block 610 and block 612 respectively represent image encoders with the same structures and parameters, which extract 2D features from an original input image. For example, an image encoder can be implemented by a VGG network, a ResNet network, etc., or by using a customized network model. Block 614 represents a symmetric conversion module. Different inputs 604, 606, and 608 are converted in corresponding angles respectively. For example, in the current embodiment, an included angle between input 604 and input 602 is 180 degrees, so symmetric conversion module 614 converts features of input 604 by 180 degrees, and processes inputs 606 and 608 in the similar way. After the symmetrical conversion, 2D features 616, 618, and 620 subjected to symmetric conversion are obtained. Averaging operation 622 is performed on these features. Obtained results are combined with 2D feature 624 of input 602 for transmission into surface decoder 626 for 3D reconstruction to obtain 3D reconstruction feature 628. Texture encoder 630 is used to perform texture rendering on 3D reconstruction feature 628 to generate final 3D model 632. It can be understood that multi-viewing-angle processing is not necessary, but fusion of information of multiple images by multi-viewing-angle processing can optimize the generation of 3D models.

Figure 7:
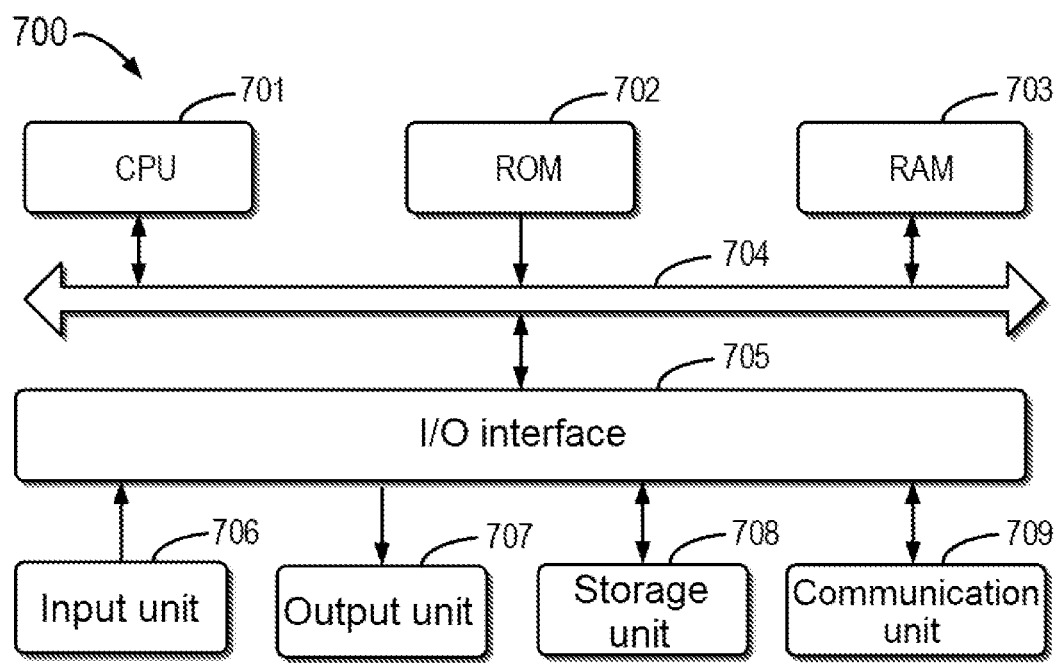
FIG. 7 illustrates a schematic block diagram of a device that may be used to implement embodiments of the present disclosure.

FIG. 7 illustrates a schematic block diagram of device 700 that may be used to implement embodiments of the present disclosure. Device 700 may be the device or apparatus described in embodiments of the present disclosure. As shown in FIG. 7, device 700 includes Central Processing Unit (CPU) 701, which may execute various appropriate actions and processing in accordance with computer program instructions stored in Read-Only Memory (ROM) 702 or computer program instructions loaded onto Random Access Memory (RAM) 703 from storage unit 708. Various programs and data required for the operation of device 700 may also be stored in RAM 703. CPU 701, ROM 702, and RAM 703 are connected to each other through bus 704. Input/Output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network, such as the Internet, and/or various telecommunication networks.

The various methods or processes described above may be performed by CPU 701. For example, in some embodiments, the methods or processes may be implemented as a computer software program that is tangibly included in a machine-readable medium, such as storage unit 708. In some embodiments, part or all of the computer programs may be loaded and/or installed onto device 700 via ROM 702 and/or communication unit 709. When the computer program is loaded into RAM 703 and executed by CPU 701, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flow charts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flow charts and/or block diagrams.

The computer-readable program instructions can also be loaded onto a computer, other programmable data processing apparatuses, or other devices, so that a series of operating steps are performed on the computer, other programmable data processing apparatuses, or other devices to produce a computer-implemented process. Therefore, the instructions executed on the computer, other programmable data processing apparatuses, or other devices implement the functions/actions specified in one or more blocks in the flow charts and/or block diagrams.

The flow charts and block diagrams in the accompanying drawings show the architectures, functions, and operations of possible implementations of the device, the method, and the computer program product according to a plurality of embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, the functions denoted in the blocks may also occur in a sequence different from that shown in the figures. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented by a dedicated hardware-based system executing specified functions or actions, or by a combination of dedicated hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method for generating a three-dimensional (3D) model, comprising:
   generating, in an image encoder of a processor-based machine learning system, two-dimensional (2D) features of a 2D image on the basis of performing feature extraction on the 2D image;
   generating, in the processor-based machine learning system, on the basis of the 2D features by using a symmetric conversion module of the processor-based machine learning system, 2D features subjected to symmetric conversion, wherein the symmetric conversion module is configured to generate the 2D features of an object in the 2D image in different viewing angles, the symmetric conversion module having an input coupled to an output of the image encoder; and
   generating, utilizing a series arrangement of a surface decoder and a texture encoder of the processor-based machine learning system, the 3D model of the 2D image on the basis of the 2D features subjected to symmetric conversion, the surface decoder having an input coupled to an output of the symmetric conversion module, the texture encoder having an input coupled to an output of the surface decoder.

2. The method according to claim 1, wherein generating, by using the symmetric conversion module, the 2D features subjected to symmetric conversion comprises:
   performing a 3D conversion operation on the 2D features to generate 3D features;
   sampling the 3D features by means of bicubic interpolation on the basis of a pose of a camera and a grid generator to generate sampled 3D features;
   performing a 3D convolution operation on the sampled 3D features to generate convolved 3D features; and
   performing 2D conversion operation on the convolved 3D features, to generate the 2D features subjected to symmetric conversion.

3. The method according to claim 2, wherein generating the 3D model of the 2D image further comprises:
   performing 3D reconstruction on the 2D features subjected to symmetric conversion by using the surface decoder, to generate 3D reconstruction features; and
   performing texture rendering on the 3D reconstruction features by using the texture encoder to generate the 3D model.

4. The method according to claim 3, further comprising:
   processing the 2D features of the object in the 2D image in a plurality of different viewing angles to generate an enhanced 3D model.

5. The method according to claim 4, further comprising:
   performing feature extraction on 2D images of the object in the plurality of different viewing angles by using an image encoder to generate the 2D features of the 2D images in the plurality of different viewing angles.

6. The method according to claim 5, further comprising:
processing the 2D features of the 2D images in the plurality of different viewing angles by using the symmetric conversion module to generate 2D features subjected to symmetric conversion of the 2D images in the plurality of different viewing angles.

7. The method according to claim 6, further comprising:
performing 3D reconstruction on the 2D features subjected to symmetric conversion of the 2D images in the plurality of different viewing angles by using the surface decoder, to generate 3D reconstruction features of the 2D images in the plurality of different viewing angles; and
performing texture rendering on the 3D reconstruction features of the 2D images in the plurality of different viewing angles by using the texture encoder, to generate 3D models in the plurality of different viewing angles.

8. The method according to claim 7, further comprising:
for each 3D model of the 3D models in the plurality of different viewing angles, determining a difference between the 3D model and a 2D image of the 2D images in the plurality of different viewing angles which is in the same viewing angle as the 3D model; and
optimizing the generation of the 3D models on the basis of minimizing the differences.

9. The method according to claim 8, further comprising:
determining a difference between the 2D features subjected to symmetric conversion of another object and the 2D features subjected to symmetric conversion of the object; and
optimizing the generation of the 3D models on the basis of maximizing the differences.

10. The method according to claim 1, wherein generating the 3D model of the 2D image further comprises:
extracting neighboring samples from a 3D estimate by using a K-nearest neighbor algorithm, and constraining differences between key points in the 3D model and the neighboring samples.

11. An electronic device, comprising:
at least one processor; and
memory coupled to the at least one processor, wherein the memory has instructions stored therein which, when executed by the at least one processor, cause the electronic device to execute actions comprising:
generating, in an image encoder of a processor-based machine learning system, two-dimensional (2D) features of a 2D image on the basis of performing feature extraction on the 2D image;
generating, in the processor-based machine learning system, on the basis of the 2D features by using a symmetric conversion module of the processor-based machine learning system, 2D features subjected to symmetric conversion, wherein the symmetric conversion module is configured to generate the 2D features of an object in the 2D image in different viewing angles, the symmetric conversion module having an input coupled to an output of the image encoder; and
generating, utilizing a series arrangement of a surface decoder and a texture encoder of the processor-based machine learning system, a three-dimensional (3D) model of the 2D image on the basis of the 2D features subjected to symmetric conversion, the surface decoder having an input coupled to an output of the symmetric conversion module, the texture encoder having an input coupled to an output of the surface decoder.

12. The electronic device according to claim 11, wherein generating, by using the symmetric conversion module, the 2D features subjected to symmetric conversion comprises:
performing a 3D conversion operation on the 2D features to generate 3D features;
sampling the 3D features by means of bicubic interpolation on the basis of a pose of a camera and a grid generator to generate sampled 3D features;
performing a 3D convolution operation on the sampled 3D features to generate convolved 3D features; and
performing 2D conversion operation on the convolved 3D features, to generate the 2D features subjected to symmetric conversion.

13. The electronic device according to claim 12, wherein generating the 3D model of the 2D image further comprises:
performing 3D reconstruction on the 2D features subjected to symmetric conversion by using the surface decoder, to generate 3D reconstruction features; and
performing texture rendering on the 3D reconstruction features by using the texture encoder to generate the 3D model.

14. The electronic device according to claim 13, wherein the actions further comprise:
processing the 2D features of the object in the 2D image in a plurality of different viewing angles to generate an enhanced 3D model.

15. The electronic device according to claim 14, wherein the actions further comprise:
performing feature extraction on 2D images of the object in the plurality of different viewing angles by using an image encoder to generate the 2D features of the 2D images in the plurality of different viewing angles.

16. The electronic device according to claim 15, wherein the actions further comprise:
processing the 2D features of the 2D images in the plurality of different viewing angles by using the symmetric conversion module to generate 2D features subjected to symmetric conversion of the 2D images in the plurality of different viewing angles.

17. The electronic device according to claim 16, wherein the actions further comprise:
performing 3D reconstruction on the 2D features subjected to symmetric conversion of the 2D images in the plurality of different viewing angles by using the surface decoder, to generate 3D reconstruction features of the 2D images in the plurality of different viewing angles; and
performing texture rendering on the 3D reconstruction features of the 2D images in the plurality of different viewing angles by using the texture encoder, to generate 3D models in the plurality of different viewing angles.

18. The electronic device according to claim 17, wherein the actions further comprise:
for each 3D model of the 3D models in the plurality of different viewing angles, determining a difference between the 3D model and a 2D image of the 2D images in the plurality of different viewing angles which is in the same viewing angle as the 3D model; and
optimizing the generation of the 3D models on the basis of minimizing the differences.

19. The electronic device according to claim 18, wherein the actions further comprise:
- determining a difference between the 2D features subjected to symmetric conversion of another object and the 2D features subjected to symmetric conversion of the object; and
- optimizing the generation of the 3D models on the basis of maximizing the differences.

20. A computer program product that is tangibly stored on a non-transitory computer-readable medium and comprises machine-executable instructions, wherein the machine-executable instructions, when executed by a machine, cause the machine to perform the following actions:
- generating, in an image encoder of a processor-based machine learning system, two-dimensional (2D) features of a 2D image on the basis of performing feature extraction on the 2D image;
- generating, in the processor-based machine learning system, on the basis of the 2D features by using a symmetric conversion module of the processor-based machine learning system, 2D features subjected to symmetric conversion, wherein the symmetric conversion module is configured to generate the 2D features of an object in the 2D image in different viewing angles, the symmetric conversion module having an input coupled to an output of the image encoder; and
- generating, utilizing a series arrangement of a surface decoder and a texture encoder of the processor-based machine learning system, a three-dimensional (3D) model of the 2D image on the basis of the 2D features subjected to symmetric conversion, the surface decoder having an input coupled to an output of the symmetric conversion module, the texture encoder having an input coupled to an output of the surface decoder.

* * * * *